United States Patent
Preuss

[15] 3,655,147
[45] Apr. 11, 1972

[54] DEVICE FOR REDUCING THE SUPERSONIC BOOM CAUSED BY AIRCRAFT

[72] Inventor: Heinz Preuss, Gothaer Strasse 54, 3 Hannover, Germany

[22] Filed: Apr. 25, 1968

[21] Appl. No.: 724,059

[30] Foreign Application Priority Data

Apr. 26, 1967 Germany ........................... P 42 011

[52] U.S. Cl. .......................................................... 244/1 N
[51] Int. Cl. ....................................................... B64c 23/04
[58] Field of Search ................... 244/1, 130, 36, 35, 35.6, 41

[56] References Cited

UNITED STATES PATENTS

| 3,446,464 | 5/1969 | Donald | 244/130 |
| 2,649,266 | 8/1953 | Darriens | 244/35.6 X |
| 2,916,230 | 12/1959 | Nial | 244/35 X |
| 3,430,446 | 3/1969 | McCloy | 244/130 X |
| 3,391,884 | 7/1968 | Carbartt | 244/45 X |

OTHER PUBLICATIONS

Moeckel, W. E.; Theoretical Clerodynamic Coefficients of Two-Dimensional Supersonic Biplanes; NACA Technical Note, No. 1316; June 1947; p. 13 and FIG. 12.

Primary Examiner—Milton Buchler
Assistant Examiner—Jeffrey L. Forman
Attorney—Richards & Geier

[57] ABSTRACT

The invention describes means for reducing the supersonic boom caused by aircraft. Underneath the aircraft reflecting surfaces are provided in the area of the maximum pressure difference of the Mach cone created by the aircraft.

3 Claims, 10 Drawing Figures

Patented April 11, 1972  3,655,147
2 Sheets-Sheet 1
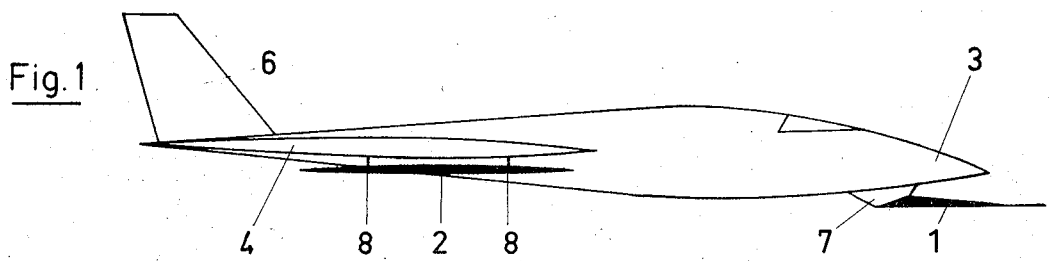
Fig. 1
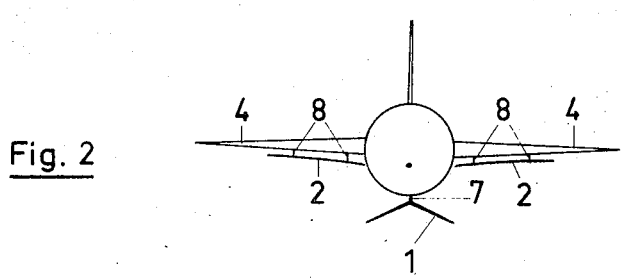
Fig. 2
Fig. 3
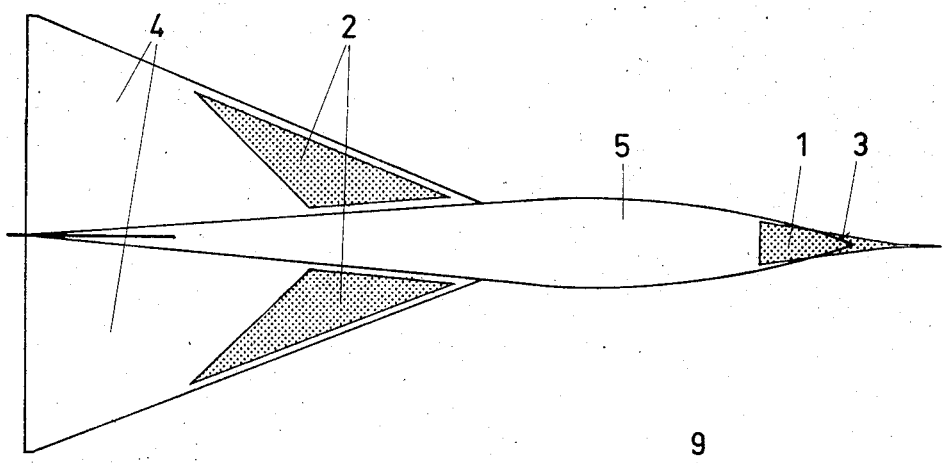
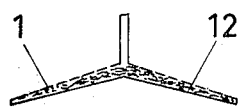
Fig. 5
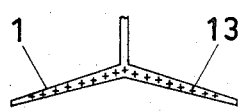
Fig. 6
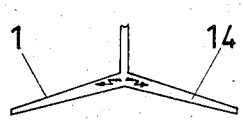
Fig. 7
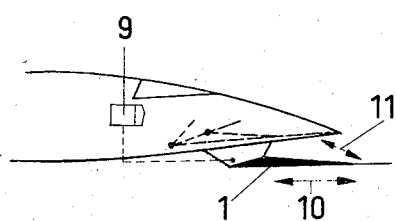
Fig. 4
INVENTOR:
H. Preuss
BY
Richards & Geier
ATTORNEYS INVENTOR:
H. Preuss

DEVICE FOR REDUCING THE SUPERSONIC BOOM CAUSED BY AIRCRAFT

DESCRIPTION

The invention relates to a device for reducing the supersonic boom caused by aircraft, especially in direction to the earth's surface.

It is known that a thunderlike boom is created by an aircraft, when it is surpassing the velocity of sound ($\approx 330$ m/sec.). This phenomena can be explained as follows:

The air is a compressible medium, i. e. fluctuations of pressure at any place in the medium always tend to compensate and to expand. The velocity of expansion at low pressure turbulences is physically defined as velocity of sound.

As long as the velocity of an aircraft is smaller than the velocity of sound, the pressure in front of the aircraft rises only gradually; the expansion speed of the turbulence caused by the aircraft is greater than the velocity of the aircraft. However, as soon as the aircraft reaches sonic speed, the pressure turbulence cannot compensate, because itself is expanding only with sonic speed. New pulsation shocks occur, which are superimposed. Finally this leads to the compression shock, which is noticed as boom. The boom wave accompanies the aircraft during the whole supersonic flight in form of a cone (Mach cone), the opening angle of which is reduced with augmenting velocity of the aircraft. The height of the pressure turbulence is the more the larger the cross-sectional area of the aircraft in direction of flight is.

As supersonic airliners are employed increasingly for military and civil purposes and the effect of the supersonic boom is very unpleasant for people and also for buildings, one has already made several tests to remove the sonic boom or to reduce it respectively. However, these tests had unsatisfactory results.

The present invention has for its object to reduce the expansion of the boom wave onto the earth's surface. According to the invention this is achieved in that in the area of the maximum pressure differences of the Mach cone caused especially by the fuselage of the aircraft, a reflecting surface is arranged at a distance underneath the fuselage of the aircraft.

The position of the reflecting surface results from the fact that especially high pulsation shocks occur at large changes in the cross section of the aircraft in direction of flight. This is valid especially for the bow point. Naturally, by the reflecting surface another sonic boom is caused, however, this is much smaller than the first boom, because the cross section of the reflecting surfaces in direction of flight is much smaller than that of the aircraft.

According to the invention the reflecting surface extends underneath the aircraft bow in a width corresponding nearly to the downward projection of the bow (namely, a width equal to the largest diameter of the bow in a horizontal plane), and in a length in direction of flight, at which at any reachable supersonic speed it is still in the area of the maximum pressure difference of the Mach cone. According to the invention the reflecting surface suitably is developed convex in longitudinal direction with respect to the fuselage of the aircraft to avoid a reflection against the fuselage of the aircraft. Thereby the boom wave is distributed and only a small part is reflected against the aircraft.

In further development of the present invention additional reflecting surfaces may be arranged underneath the wings of the aircraft, because also at the place of the wing roots a large change in cross section occurs.

According to the invention the additional reflecting surfaces extend from the root of the wings to about a width, in which the boom caused by the reflecting surfaces begins to approach that of the wings in this area, whereby the length in direction of flight of the aircraft is such, that the reflecting surfaces at any reachable supersonic speed still are in the area of the maximum pressure difference of the Mach cone.

According to the invention the reflecting surfaces and their suspensions are in longitudinal section shaped streamlined.

Further advantages and details of the invention will become apparent from the following more detailed description which is made with reference to the accompanying drawings.

In the drawings;

FIG. 1 is a schematic view of a supersonic airliner,

FIG. 2 is a schematic front view of a supersonic airliner,

FIG. 3 is a schematic view of a supersonic airliner from below,

FIG. 4 is a schematic view of an adjustable reflecting surface at tee bow of the aircraft and its connection with an electronic computer, FIGS. 5 – 7 are the schematic views of the cross section of a reflecting surface.

Figure 9:
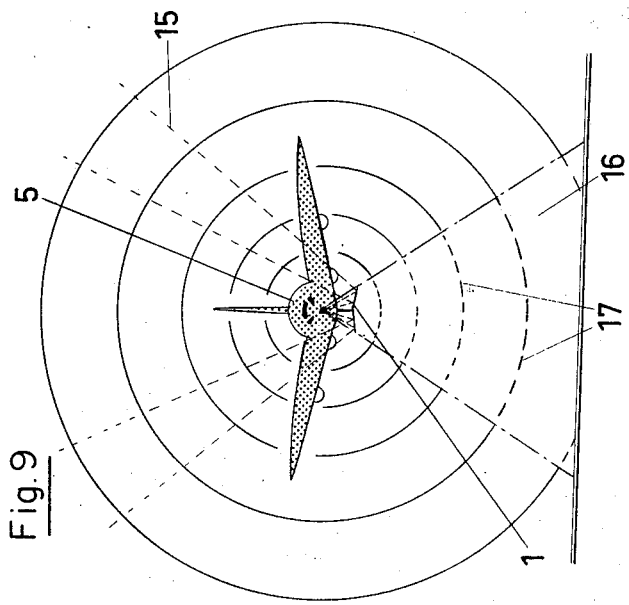
FIGS. 9 and 10 show schematically the operation of the present invention.

The fuselage of the supersonic airliner shown in FIGS. 1 to 3 has the reference numeral 5, the wings 4, the tail unit 6, and the bow point 3. Underneath the bow point 3 of the fuselage 5 a reflecting surface 1 is arranged at suspensions 7 in the area of the maximum pressure difference of the Mach cone caused by the fuselage. As can be seen from FIG. 2 reflecting surface 1 is convex to the fuselage 5 in the longitudinal direction of same. Thereby the sound reflection in direction to fuselage 5 is reduced and the largest part of the sound, which is reflected by reflecting the surface 1 passes fuselage 5. Underneath wings 4 further reflecting surfaces 2 are secured at suspensions 8, as shown in the embodiment.

In FIG. 3 the surface expansions of the reflecting surfaces 1 and 2 are schematically shown in a ratio to the downwardly directed projection surface of the aircraft formed by fuselage 5 and wings 4. The surface extension of reflecting surfaces 1 and 2 has to be chosen so that at any reachable supersonic speed the surfaces still are within the area of the maximum pressure difference of the Mach cone produced by fuselage 5 and wings 4 respectively.

For this purpose it is also possible to provide an adjustable reflecting surface. From FIG. 4 can be taken, how a computer 9 is connected with adjustable surface 1 and is controlling the adjustability. Arrows 10 and 11 show the direction of the adjustability.

As shown in FIGS. 5 to 7 the reflecting surfaces may be hollow and may partly be filled with a damping material 12 this damping material may be glasswool or the like and serves to absorb some of the frequencies of the reflected shockwave. It should be noted in this connection that a part of the wave spectrum of the supersonic boom is influenced only by the damping material, so that the damping material supports the action of the reflecting surface. If there is no damping material a part of the boom, namely, the long wave portion, could be bent by the edges of the reflecting surface, so that this part would reach the earth surface. It is also possible to provide the hollow space with a vacuum chamber 13, so that the sound waves can be reflected better The effect of vacuum chamber is similar to that of the damping material. Pressure within a hollow reflecting surface can influence a part of the wave spectrum of the boom, which could not be controlled solely by reflection. The effect of superpressure is similar to that of damping material. Pressure within a hollow reflecting surface can influence a part of the wave spectrum of the boom, which could not be controlled solely by reflection. By an electric charging 14 the air being directly at a reflecting surface can be ionized, whereby better damping qualities are achieved. Temperature variations at the reflection surface can be used to change the drop angle of the pressure wave being reflected, so that the incidence angle will be a different one. If necessary the direction of the reflected pressure wave can be varied by high temperatures of the reflecting surface. Any suitable means (not shown) can be used to supply the electric charge.

Figure 8:
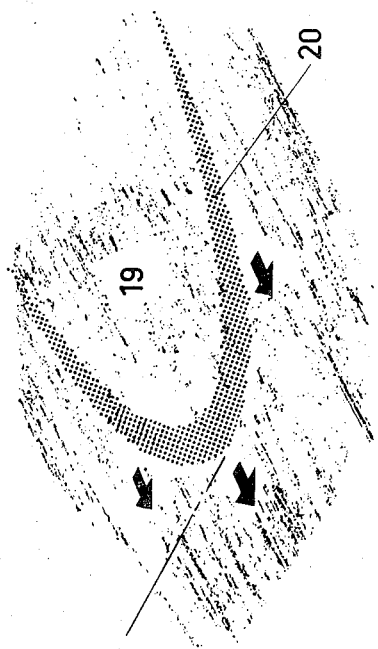
FIG. 8 shows the impact on the earth's surface of a supersonic pressure turbulence caused by an aircraft.

FIG. 8 shows the impact on the earth's surface of a pressure turbulence caused by aircraft 5, which is noticed as supersonic boom. The surface being struck by the supersonic pressure turbulence has an outer shape like a parabola 20. With large supersonic airliners an unreduced pressure turbulence noticed as supersonic boom is so vehement that it may cause great damage at the earth's surface.

Figure 10:
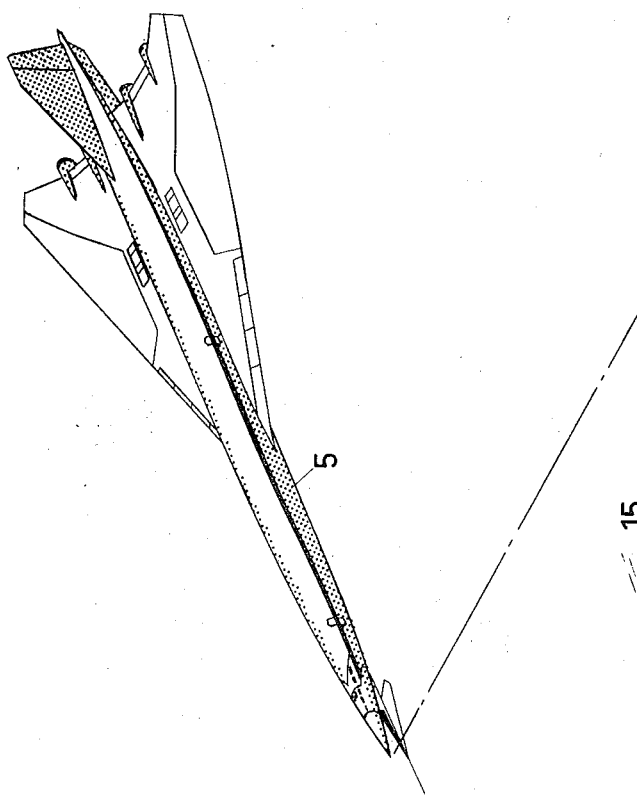
Figure 10:
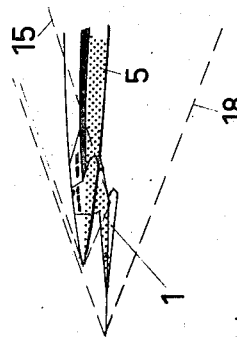

As indicated in FIG. 9, the pressure turbulence deriving from the aircraft 5 partly is reflected at reflecting surface 1. The reflection lines are numbered with 15. They are deflected in upward direction, so that in an area 16 the pressure turbulences striking the earth are considerably reduced. The reduced pressure turbulences have reference numeral 17. In FIG. 10 the reflection procedure is illustrated in a side view. It can be seen, how the reflected pressure turbulences 15 are deflected in upward direction. The considerably reduced pressure turbulences 18 deriving from the reflecting surface 1 can expand undisturbed and reach the earth's surface.

I claim:

1. Device for reducing the sonic boom produced by aircraft, especially in direction toward earth's surface, comprising a reflecting surface located at a distance underneath the fuselage of the aircraft in the area of the maximum pressure difference of the Mach cone caused especially by the fuselage, said reflecting surface being convex in the longitudinal direction to the fuselage to reduce reflection against the fuselage.

2. A device for reducing the sonic boom produced by aircraft, especially in the direction to the earth's surface, comprising a hollow reflecting surface which is arranged at a distance underneath the fuselage of the aircraft in the area of the maximum pressure difference of the Mach cone caused especially by the fuselage of the aircraft, super pressure being present in said hollow reflecting surface for better reflection.

3. A device for reducing the sonic boom produced by aircraft, especially in the direction to the earth's surface, comprising a reflecting surface which is arranged at a distance underneath the fuselage of the aircraft in the area of the maximum pressure difference of the Mach cone caused especially by the fuselage of the aircraft, and means heating said reflecting surface to obtain a warmer layer of air directly at the reflecting surface.

* * * * *